United States Patent [19]

Fries

[11] 3,809,898
[45] May 7, 1974

[54] METHOD OF DETECTING AIRCRAFT FUEL LINE LEAKS WITH RADIOACTIVE GAS TRACERS

[75] Inventor: Bernard A. Fries, Orinda, Calif.

[73] Assignee: Chevron Research Company, San Francisco, Calif.

[22] Filed: Aug. 4, 1971

[21] Appl. No.: 169,060

[52] U.S. Cl. ............................................... 250/303
[51] Int. Cl. .............................................. G21h 5/02
[58] Field of Search ...... 250/43.5 FC, 43.5 MR, 44, 250/106 T, 303

[56] References Cited
UNITED STATES PATENTS

| | | | |
|---|---|---|---|
| 2,058,774 | 10/1936 | Colligan | 250/106 T X |
| 3,340,398 | 9/1967 | Winkler et al. | 250/106 T X |
| 3,370,173 | 2/1968 | Ackerman et al. | 250/43.5 FC X |
| 3,597,611 | 8/1971 | Harman et al. | 250/106 T X |
| 2,769,913 | 11/1956 | Mazzagatti | 250/43.5 FC |

OTHER PUBLICATIONS

"Radioactive Isotopes as Tracers," by A. W. Kramer, from Power Plant Engineering, Nov. 1947, pgs. 105–108.

*Primary Examiner*—Archie R. Borchelt
*Attorney, Agent, or Firm*—G. F. Magdeburger; C. J. Tonkin; S. R. La Paglia

[57] ABSTRACT

A method of detecting aircraft fuel line leaks by dissolving trace amounts of a radioactive gas such as krypton-85, tritium, etc., in the fuel and measuring the level of radioactive emanations along the fuel system. An increase in the intensity of such emanations is noted in the vicinity of the leak.

3 Claims, No Drawings

METHOD OF DETECTING AIRCRAFT FUEL LINE LEAKS WITH RADIOACTIVE GAS TRACERS

BACKGROUND OF THE INVENTION

1. Field of the Invention

This invention relates to leak detection, and more particularly, the detection of leaks in aircraft fuel systems.

There are several methods of detecting leaks from closed systems such as an aircraft fuel system. The most natural and primitive methods, human sight and smell, are still in wide use.

In finding fuel leaks from closed systems, the human senses may be aided by the inclusion of odoriferous matter in the fluid, or by adding dyes to the fluid to produce visible stains at the leak. The latter method is particularly favored in the aircraft industry. However, it is inconvenient, dangerous and quite time-consuming. An urgent need exists for alternative methods of fuel system leak detection.

Fuel line leaks are especially difficult to detect in jet aircraft. In the case of gasoline powered (nonjet) aircraft, the fuel lines are examined for odor and spots of dye left by the evaporating gasoline at the point of leakage. However, the low volatility of jet fuel makes this approach unrewarding, so present procedure is to fill the tanks with ordinary aviation gasoline, pressurize the tanks, and search for odor and dye stain.

A more sensitive method would be to introduce helium into the fuel and use a "helium leak detector" (helium-sensitive mass spectrograph) to find the point at which the helium is released from the fuel system. However, the bulkiness of the equipment and the lack of portability are valid criticisms of the helium method.

In the method of the present invention a radioactive beta ray emitting gas (radiogas) of sufficient specific activity (curies/ml), which is inert toward fuel and fuel systems, is dissolved in the fuel. At the site of the leak the dissolved radiogas tracer evolves from the less volatile liquid into the surrounding atmosphere where it is detected.

For comparison, previous applications of the radioactive tracer technique to leak testing have utilized heavy metal radioactive substances in a hydrocarbon-soluble chemical form to detect leaks in buried hydrocarbon-carrying pipelines (a situation requiring penetrating gamma radiation); or have added a radiogas tracer to a purely gaseous phase to detect leaks of said gas from a closed system.

2. Description of the Prior Art

The use of radioactive substances as tracers is well known in the prior art. Radioactive materials have been used to locate obstructions to fluid flow in pipelines, U.S. Pat. No. 1,662,429, log the nature of formations through which a borehole has been drilled, U.S. Pat. No. 2,303,709, determine the wear of relatively moving surfaces, U.S. Pat. No. 2,315,845, determine the density of inaccessible fluids such as those enclosed in a pipeline, U.S. Pat. No. 2,316,239, measure the thickness of tube walls and other materials, U.S. Pat. No. 2,486,902, detect the presence of water in fuel tanks or fuel lines, U.S. Pat. No. 2,487,797, etc.

Leak testing methods using radioactive tracers include: U.S. Pat. No. 2,518,327, which utilizes a radioactive tracer gas in a gas-filled, buried, lead-sheathed cable; the radiogas tracer emits both gamma rays, which penetrate the lead sheath and allow detection of the buried cable, and beta rays, which do not penetrate the lead sheath and are detectable only at a break in the cable; and U.S. Pat. No. 2,346,043, which utilizes a heavy metal radioactive tracer in the form of a chemical compound which is soluble in hydrocarbons in order to detect leaks in buried pipelines. Of course, in the case of buried pipelines and cables, the tracer preferably gives off hard gamma rays to be detectable at the surface. U.S. Pat. No. 2,999,162 utilizes tritium gas to detect leaks in a closed system by pressurizing the system with tritium gas at superatmospheric pressure and conducting gas sampled from the space around the system for gas leakage into a Geiger counter or other detecting device.

SUMMARY OF THE INVENTION

The present invention concerns a novel method of detecting fuel system leaks. It is especially convenient for aircraft because of its safety, efficiency, and the fact that leak detection can be achieved with portable hand-held equipment. In the method of this invention, a beta ray emitting, chemically inert, radioactive gas (radiogas) of sufficient specific activity (curies/ml) is introduced into the fuel. The fuel is circulated through the fuel system. At the point of fuel leakage, the chemically inert radiogas is evolved into the atmosphere from the less volatile fuel. A means of locally sampling the air, and measuring its radioactivity, is passed over the fuel system until the increased intensity of the measured radioactivity serves to identify and locate the leak. It was discovered that the specific activity, and solubility in fuel, of several inert radiogas beta emitters was sufficient to make small fuel leaks detectable by this method.

In distinction to other leak-detecting methods, it is decidedly unadvantageous to utilize gama ray emitting tracers because of the intense penetrating power of gamma radiation. That is, radiation penetrating the fuel system at every point will be detected, making it difficult to localize a leak. On the other hand, nongaseous chemical tracers which are hydrocarbon-soluble will lead to problems of fuel system contamination, and because of their very low volatility will not be readily evolved from the nonvolatile fuel, making detection less efficient.

DESCRIPTION OF THE PREFERRED EMBODIMENTS

In the leak detecting method of this invention, a radioactive gas which is chemically inert towards fuel is introduced into the enclosed fuel system. The radioactive gas constitutes a dissolved, but readily evolved, radioactive tracer. The tracer is allowed to disperse itself in the circulating fuel of the enclosed fuel system.

A means of locally sampling the air and measuring its radioactivity is then passed slowly (scanned) over individual sections of the fuel system, e.g., pipes, valves, pumps, joints and connectors, etc. The rapidity of the scanning depends on the response time of the measuring apparatus to be discussed below. The scanning rate from area to area must be appreciably less than the response time in order to localize the leak in a given area of the fuel system. Once localized, the suspected area may be reduced to smaller areas, each of which is slowly scanned.

At the leak, the radioactive gas is evolved from the fuel exposed to the atmosphere. If the radioactive gas has been properly chosen in accordance with the specifications of this invention, the sampling apparatus will measure appreciably greater amounts of radioactivity in the vicinity of the leak.

Radioactive Gas

The requirements for the radioactive gas of the present invention include chemical inertness towards the fuel and fuel system and a high specific activity (curies/ml). It was found that certain suitable radioactive gases, such as tritium and the fission products $^{133}$Xe and $^{85}$Kr, sold commercially by the U.S. Atomic Energy Commission, are available with such high specific activities that solubility of the radiogas in the fuel presents no problems. These specific activities, expressed as curies/ml, are 2.6 for $^3$H, 24 for $^{133}$Xe, and 0.06 for $^{85}$Kr, but concentrations of $^{85}$Kr as high as 0.6 curies/ml have also been prepared. Specific activies far below these are suitable in the application of this invention, but specific activities from 0.01 curies/ml and higher are preferred.

It is also preferred that the radiogas give rise to radiation of low penetrating power to avoid the necessity for unwieldy amounts of shielding of the measuring apparatus, but not so low as to make the radiation too weakly detectable. For example, alpha rays, which are helium nuclei ejected with high velocity from heavy nuclei, have a high specific ionization, that is, they produce a large amount of ionization in traversing unit thickness of matter. For this reason, their range is short; they penetrate only a few centimeters of air at atmospheric pressure. They may be detected in gaseous ionization chambers, but mitigating against their use is their acute radiotoxicity.

On the other hand, beta rays, which are electrons emitted from the nucleus with a range of particle energies, have a lower specific ionization than alpha particles and consequently have longer ranges for the same particle energy.

Gamma rays are electromagnetic rays of very short wave length and are much more penetrating than beta rays. In general, the penetrating power of the gamma ray increases with increasing energy.

Heavy shielding would be required to avoid an appreciable amount of background radiation from the penetrating gamma rays of a gamma emitting radiogas dispersed throughout the entire fuel system. Thus, principally beta ray emitting radiogases are preferred in order to avoid the problem of heavy shielding.

$^{35}$S is a pure beta ray emitter. It could be used as a radiogas tracer in the form of $SO_2$ or $SF_6$. However, for reasons of chemical inertness of the radiogas towards the fuel ($SO_2$), the necessity for chemical synthesis of the tracer gas, its higher radiotoxicity and its very high price (about $5.00 per millicurie), the use of sulfur containing radiogas tracers is not desirable.

In spite of the difficult requirements in the choice of a radiogas, at least three gases were found to offer preferred performance characteristics in the method of this invention at reasonable cost. These gases are inert, require no chemical synthesis, may be used as supplied, have sufficient solubility in the fuel, have sufficient specific activity, and are readily evolved on exposure to the outside atmosphere.

Tritium ($^3$H) is a pure beta ray emitter of very low energy (0.018 MeV). Tritium has a half-life of 12.1 years. $^3$H may be utilized in the present invention as $H_2$ or $CH_4$ (or some other inert compound which is easily evolved from the fuel). Although difficult to detect, $^3$H can be measured in air with commercial ionization chambers ("Tritium Monitor") at concentrations as low as about $5 \times 10^{-8}$ curies/ft.$^3$. $^3$H is available at a cost of only $2.00 a curie. It is safe and convenient to use because of its low toxicity, due to its low energy beta ray emissions. Since there is no associated gamma radiation, there is no need to shield the testing equipment from radiation which might enter through the walls of the equipment. Only when tritium itself is materially transported and enters the testing chamber does it cause observable effects.

Krypton-85 emits higher energy beta rays (0.7 MeV) which are easily detectable with Geiger tubes. The sensitivity of a tritium monitor is about $1 \times 10^{-9}$ curies/ft.$^3$ for krypton-85. This radiogas sells for $22.00/curie and has a half-life of 10 years. $^{85}$Kr also emits 0.5 MeV gamma rays, but in such a small fraction of its decays, 0.5 percent, that little or no shielding of the detector is required.

Xenon-133 has a very desirable half-life of 5 days and emits beta rays of 0.35 MeV. However, the cost is $100.00/curie and 37 percent of its decays give rise to 0.08 MeV gamma rays. While the gamma radiation of $^{133}$Xe is of low energy, its quantity may require some shielding of the detector.

In order to establish the utility of the invention with these radiogases, tests were carried out on a sample system as reported in the examples below.

Detection Apparatus

In one of many possible configurations of testing equipment capable of utilizing the method of this invention, the detection apparatus comprises a pump having its inlet in communication with the space surrounding the area of the fuel system to be scanned, a detecting device for detecting low energy nuclear radiation from a gaseous sample, and a means interconnecting the detecting device and the pump outlet, whereby radiogas evolving from the leaking fuel is delivered to the detecting device.

Detection devices include ionization chambers, gas discharge detectors and various solid-state detectors such as sodium iodide crystals, plastic scintillators, semiconductor detectors, etc., but particularly preferred are Geiger counters and commercial tritium monitors.

The detection of the radiogas tracer is dependent on the leak rate, the effective size of the detector and the size of the counting chamber (the larger the counting chamber, the greater the count rate for a given detector and concentration of radiogas), and the sampling air flow rate into the chamber (the greater the flow rate, the greater the dilution of the radiogas and the lower the count rate for a given leak rate). Some compromise between chamber size and air sampling rate must be reached to achieve a reasonable response time.

Commercial tritium monitors have ion chambers of 1 to 10 liters in size; chambers enclosing Geiger tubes would be similar in size.

EXAMPLES

An aircraft fuel tank and fuel lines were simulated by a 17-gallon tank and a copper tubing loop completely filled with kerosene. The fluid was continuously circulated through the loop. A controlled leak was established by loosening a screw fitting on the tubing, allowing drops of kerosene to run along the screw thread before dripping off.

$^{85}$Kr radiogas containing 1.0 millicuries was injected into the flow line through a septum. This was equivalent to about 2 curies in a 30,000 gallon airplane tank. A small (¾ inch × 3 inches) Geiger tube immersed in the tank continuously monitored the dissolved $^{85}$Kr concentration. This did not change during several days of testing.

The detection system consisted of a 2 × 20 inch Geiger tube enclosed in a chamber with a hose having a 4 inch funnel on the end as the sniffer; air was drawn through the hose by house vacuum. The funnel was placed close to the leak.

The rate at which dissolved $^{85}$Kr escaped from kerosene was also measured. About 10 ml was placed in an uncovered 50 ml beaker and allowed to stand without agitation. After one minute 30 percent of the $^{85}$Kr was gone, after three minutes 60 percent was gone. The tracer gas was not evolved instantaneously but appeared rapidly enough to be useful. In the confines of an aircraft fuselage, there would be less dispersion of the escaping gas into the surrounding air with a consequent higher collection efficiency of the radiogas.

EXAMPLE 1

The Geiger tube was placed in a 14 inch diameter by 26 inch high chamber. This gave a very high accounting efficiency but required a high sampling flow rate to displace the air in the chamber in a reasonable time. With a liquid leak of 0.5 ml/min. (8 × 10$^{-9}$ curies/min.) and an air rate of 0.1 ft.$^3$/min., the observed net count rate was 2 counts/second above a background of 13 counts/second. The expected count rate if all the escaping $^{85}$Kr entered the chamber was 50 counts/second.

The drip was then allowed to fall on a warm surface and a partial shroud placed at the leak to reduce turbulence from the room air and to better direct the air flow into the air inlet. The count rate slowly rose to 3 count/second after 30 minutes, then to 11 count/second after 45 minutes. The displacement time in this large chamber was about 20 minutes.

EXAMPLE 2

A smaller chamber (4 inch diameter × 26 inch) was used to reduce the displacement time, but a slower air flow rate was also used. With 0.02 ft.$^3$/min. of air and a drip rate of 0.5 ml/min. onto a warm surface, the net count rate was 1.6 count/sec. With 0.07 ft.$^3$/min. of air and a drip rate of 0.3 ml/min., the count rate increased to 2.6 count/second. The warm surface was then removed and a more complete shroud formed for directing the air flow. With a drip of 0.5 ml/min. and air at 0.07 ft.$^3$/min., the count rate was 7 count/second.

To find leaks of a fraction of a milliliter/hour may require 10 or more curies of $^{85}$Kr in fluid systems of capacities of 10,000 gallons or more. Neither the cost nor the handling problem would be excessive. If $^3$H is chosen as the tracer, at least 100 curies may be required, but at no greater cost and with even less handling problems.

I claim:

1. A method of detecting leaks in aircraft fuel systems containing hydrocarbon fuel, comprising the steps of introducing a chemically inert beta ray emitting radioactive tracer gas into said hydrocarbon fuel and measuring the intensity of radiation outside said fuel system, whereby a localized increase in said intensity indicates the presence and location of a fuel leak.

2. A method of detecting leaks in aircraft fuel systems according to claim 1 wherein the beta ray emitting radioactive tracer gas has a specific activity in the range from 0.01 to 20 curies/ml and is chemically inert towards the fuel and fuel system.

3. A method of detecting leaks in aircraft fuel systems according to claim 1 wherein the beta ray emitting radioactive tracer gas is chosen from the group comprising $^3$H, $^{85}$Kr and $^{133}$Xe.

* * * * *